(12) United States Patent
Khajavi et al.

(10) Patent No.: US 8,382,988 B2
(45) Date of Patent: Feb. 26, 2013

(54) PROCESS FOR THE PRODUCTION OF ULTRA PURE WATER USING A MEMBRANE

(75) Inventors: Sheida Khajavi, The Hague (NL); Frederik Kapteijn, Purmerend (NL); Jacobus Cornelis Jansen, Deflt (NL)

(73) Assignee: Techische Universiteit Delft (NL)

( * ) Notice: Subject to any disclaimer, the term of this patent is extended or adjusted under 35 U.S.C. 154(b) by 6 days.

(21) Appl. No.: 13/131,984

(22) PCT Filed: Nov. 30, 2009

(86) PCT No.: PCT/NL2009/050727
§ 371 (c)(1),
(2), (4) Date: Aug. 16, 2011

(87) PCT Pub. No.: WO2010/064906
PCT Pub. Date: Jun. 10, 2010

(65) Prior Publication Data
US 2011/0290729 A1    Dec. 1, 2011

(30) Foreign Application Priority Data
Dec. 1, 2008 (EP) .................................... 08170399

(51) Int. Cl.
 B01D 15/00    (2006.01)
 B01D 1/44    (2006.01)
 B01D 39/00    (2006.01)
(52) U.S. Cl. ................... 210/640; 210/900; 210/500.25

(58) Field of Classification Search .................. 210/640, 210/651, 500.25, 490, 900; 95/52
See application file for complete search history.

(56) References Cited

U.S. PATENT DOCUMENTS

| | | | | |
|---|---|---|---|---|
| 4,330,518 A | * | 5/1982 | Kostinko | 423/709 |
| 5,362,466 A | * | 11/1994 | Araya | 423/328.1 |
| 6,379,436 B1 | * | 4/2002 | Kuznicki et al. | 96/125 |
| 6,403,660 B1 | * | 6/2002 | Espinoza et al. | 518/700 |
| 7,214,719 B2 | * | 5/2007 | Jansen et al. | 518/700 |
| 7,837,763 B2 | * | 11/2010 | Calundann et al. | 95/45 |
| 7,858,062 B2 | * | 12/2010 | Larsen et al. | 423/239.2 |

FOREIGN PATENT DOCUMENTS

| EP | 1524254 A1 | 4/2005 |
|---|---|---|
| WO | 9923034 A1 | 5/1999 |

OTHER PUBLICATIONS

Sheida Khajavi et al: "Application of Hydroxy Sodalite Films as Novel Water Selective Membranes" Journal of Membrane Science, 20090105 Elsevier Scientific Publishing Company, Amsterdam, NL, vol. 326, No. 1, pp. 153-160, XP025710634 (Oct. 4, 2008).
PCT/NL2009/050727 International Search Report, mailed Jan. 13, 2010.

\* cited by examiner

*Primary Examiner* — Ana Fortuna
(74) *Attorney, Agent, or Firm* — Waddey & Patterson, P.C.; Rebecca McClintock Barnett

(57) ABSTRACT

The invention is directed to a process for the production of ultra pure water, comprising feeding water containing ions and optionally other impurities to one side of a membrane based on hydroxy sodalite (H-SOD), and recovering ultra pure water from the other side of the membrane.

20 Claims, 1 Drawing Sheet

Schematic drawing of the pervaporation set up (V: valve, PI: pressure indicator, TR: temperature recorder, BPC: back pressure controller, CT: cold trap)

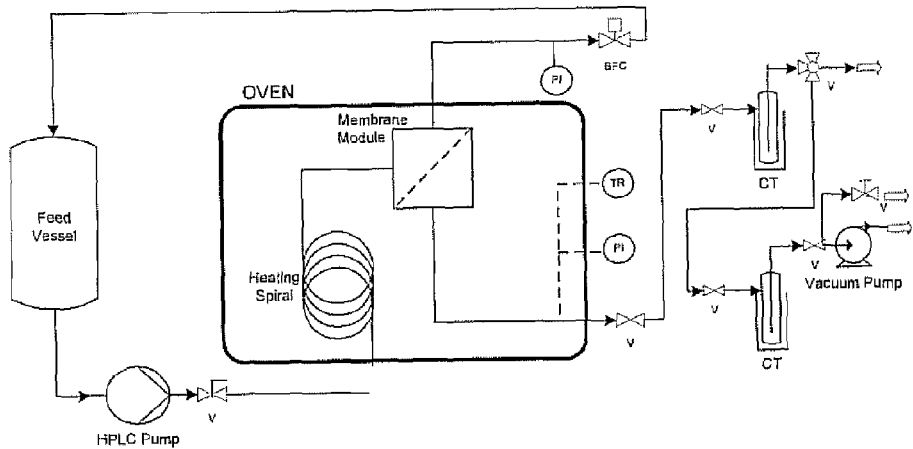
Figure 1- Schematic drawing of the pervaporation set up (V: valve, PI: pressure indicator, TR: temperature recorder, BPC: back pressure controller, CT: cold trap)
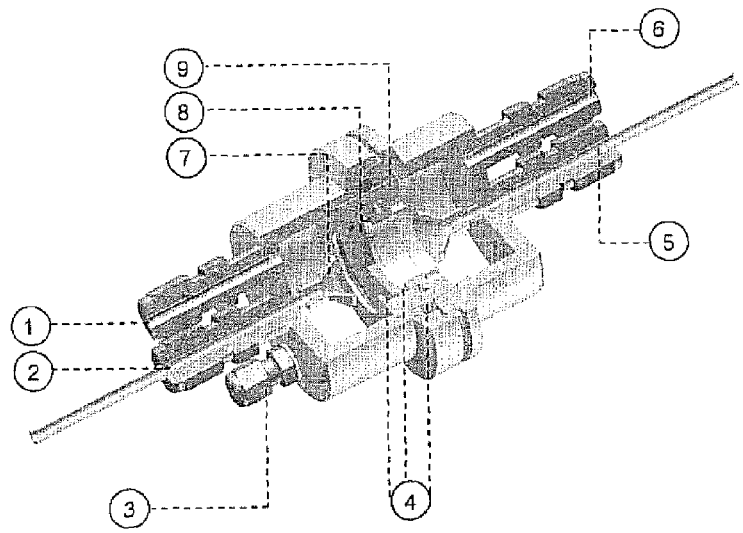
Figure 2- Lab-scale disk membrane design module used in the PV alcohol dehydration (1: retentate, 2: feed, 3: thermocouple at feed, 4: Kalrez O-rings, 5: permeate, 6: thermocouple at permeate, 7: distributor, 8: membrane, 9: membrane flange)

PROCESS FOR THE PRODUCTION OF ULTRA PURE WATER USING A MEMBRANE

This application is a 371 of PCT/NT09/5072, filed on Nov. 30, 2009, which claims priority of European Application EPO 08170399.3, filed on Dec. 20, 2008.

The invention is directed to a process for the production of ultra pure water. Ultra pure water is defined as water containing less than 2 ppm of ions as determined by Inductively Coupled Plasma Optical Emission Spectroscopy (ICP-OES).

Water containing ionic impurities, as well as particles, salts and bacteria, is generally purified using the well-known Millipore equipment (or similar apparatuses), which is widely used in laboratoria. A device is used therein where tap water is initially passed through different stages of filters to give demineralised water (demi-water). The demi-water is stored and upon need, is further purified to ultra pure water by means of reverse osmosis. Before discharge, water is exposed to UV radiation to eliminate bacteria.

This is a very complicated and expensive system, requiring multiple steps before the water of the required purity is obtained. It is an object of the present invention to provide a simple and inexpensive method for producing ultra pure water, for example as defined above, in an easy way, preferably in one step.

The invention is based on the surprising discovery that it is possible to use hydroxy sodalite, a zeolite type material, for the production of ultra pure water.

The invention is accordingly directed to a process for the production of ultra pure water, comprising feeding water containing ions and optionally other impurities to one side of a membrane based on hydroxy sodalite (H-SOD), and recovering ultra pure water from the other side of the membrane.

It is quite surprising that a membrane based on this zeolite can be used to produce ultra pure water, as other zeolites do tend to let ions pass through. Only with hydroxy sodalite it is possible to produce ultra pure water in one step. The purity of the water is quite good, namely less than the detection limit of the analysis (less than 0.01 mg/l impurities).

Although hydroxy sodalite is porous as it has proven to let water permeate, since the pores are very small, it is considered as a non-porous material and its potentials have thus not been explored.

Other types of zeolite membranes have been utilised to purify water through Reverse Osmosis (RO). These have been reported by Li et al (Liangxiong Li, Junhang Dong, Tina M. NenoW, Robert Lee Desalination 170 (2004) 309-316) and Luke et al (Mikel C. Duke, Jerry Y. S. Lin, Joe C. Diniz da Costa, oral presentation at ICIM 10, Tokyo/Japan, 2008). Both parties discuss using ceramic membranes to purify water. While similar types of membranes are used by these groups (zeolitic), the employed process is solely based on reverse osmosis, in which the cross membrane pressure is the driving force for permeation. The obtained purity is not as high as by the system of the present invention.

The invention makes use of a one-unit system comprising of a highly water selective inorganic membrane, namely Hydroxy Sodalite (H-SOD), which only allows water to pass through while other impurities including fine particles, salts, organic materials, bacteria, and ions are withheld. The separation is purely based on molecular sieving.

Sodalite is a zeolite-type material having as the largest apertures exclusively 6-membered rings, so-called sodalite cages. Hydroxy sodalite (sodalite hydrate, hydroxo sodalite) is the hydrated form of sodalite. It can be synthesized without a template from an aqueous solution and contains water molecules in all its pores. Hydroxy sodalite is used without activation.

A definition of hydroxy sodalite can be found in "Atlas of Zeolite Frameworks", 5th revised Ed. Elsevier 2001, pages 254 and 255.

Hydroxy sodalite belongs to the group of feldspathoids and is a so-called cubic feldspathoid. It is entirely built of the so-called β-cages. These cages are truncated octahedrons. A truncated octahedron has 6 square faces and 8 hexagonal faces, which give it 36 edges and 24 vertices. A T (tetrahedral) atom (Si, Al) is located at each vertex. Oxygen atoms are located between the tetrahedral atoms (but not necessarily on the edge). So the edges are not meant to portray bonds, but merely the geometry of the polyhedron. In sodalite, this polyhedral arrangement can be distorted so that the exact arrangement of oxygen atoms is not regular.

The technology here is a one-step process that directly produces very high purity water. The purity levels obtained here are not reported elsewhere. In addition, the technique here is different than the other alternatives in that it does not rely only on reverse osmosis. The water is passed through the membrane, either by the thermodynamic potential (concentration gradient, temperature and the like), pressure difference or a combination of both. It is preferred to operate with water in the liquid phase at the feed side and a vapour phase at the other side of the membrane.

The membrane is preferably the top layer of a suitable porous material or supported on a suitable porous support, such as a metal or, most preferred, a ceramic support, such as sintered α-alumina. Optionally, a mesoporous layer, such as a silica or titania layer, may be present between the support and the hydroxy sodalite layer. The thickness of the membrane is preferably between 0.1 and 50 μm, more preferred between 2 and 20 μm.

The membrane has preferably a closed structure, i.e. there should be substantially no cracks or pin holes in the membrane, other than the pores of the sodalite structure.

As indicated above, the water passes through the membrane, without the need for external pressure, i.e. not based on reverse osmosis. However, it may be possible to apply excess pressure, such as up to 20 bar excess to maintain a liquid phase at the feed side of the membrane, especially in case of temperatures of over 100° C. Therefore the process of the invention may be carried out at a pressure above the vapour pressure of water at the temperature used.

The process of the invention is quite simple, as it only requires passing the water with impurities to the membrane unit. This may be a cross-flow or another type of membrane unit. After some time it may be needed to clean the membrane. Even though the impurities will not enter the hydroxysodalite, some contaminants may accumulate on the surface. The conventional ways of cleaning may be used, such as back flow treatment.

The process for preparing a suitable membrane comprises providing a suitable porous membrane support material, preferably a ceramic support material, such as a-alumina, steel coated with titania and the like providing a solution of a silicate and an aluminate in water and reacting the solution under hydrothermal conditions to produce a hydroxy sodalite layer on the surface of the porous material. Hydrothermal conditions are preferably temperatures of at least 125° (up to 500° C.), for a period of at least 2 hours, preferably under autogenous conditions. Once the required sodalite material has been formed, the reaction is stopped and the hydroxy sodalite is washed. The membrane is then ready for use, as no activation is needed. Actually, the conventional activation procedure to burn away a template is detrimental to the material.

The supported membrane modules may subsequently be fitted into a membrane cell, with one or more tubular or flat modules, in which the ends of the tubes or the circumvent of the disks are fitted with sealing means to make sure that the inside and outside of the membranes are only connected through the pores of the membrane. This gas-tight membrane sealing is thus very important for a good functioning of the membrane. For the best results O-rings, epoxy-resin sealing or graphite ring sealing are preferred.

The membranes of the invention have a flux which may be at least 1 kg of water/m$^2$/h, even up to 3.2 kg/m$^2$/h or higher. Based on these values the skilled person can easily calculate the membrane surface area required.

In the figures,

FIG. 1 shows a schematic drawing of the pervaporation set up and

FIG. 2 shows a lab-scale disk membrane design module.

EXAMPLES

Preparation of a Membrane

Disk shaped α-alumina membrane supports having the following dimensions: 25 mm in diameter, 2 mm thickness, 80 nm top layer pore size and 150 nm bottom pore size, were prepared. The pore size distribution is asymmetrical.

Prior to synthesis, the disks need to be cleaned, in order to remove dust and other impurities. After the support was manufactured, cleaning with ammonium hydroxide and hydrogen peroxide solutions was carried out.

Just before the synthesis the supports were thoroughly washed with demineralised water. The bottom side of the disk was covered with a teflon holder to prevent crystallization.

Syntheses in rotating autoclaves seemed (according to SEM analysis) to give a better zeolite layer on the support. One explanation could be that by continuous rotation concentration- and temperature profiles along the synthesis autoclave can be minimised and nutrient mass transfer from sol to the support can be optimised. The second modification was a change in nutrient concentration. SEM-pictures showed large agglomerates of crystals (so called 'cauliflowers') freely formed as well as attached to the support and zeolite layer. These agglomerates indicate a too large amount of nutrients, which induces unwanted free crystal growth next to the (wanted) zeolite crystal growth on the support. Several syntheses with decreased amounts of Si and Al (but always with a high pH) lead to a final modified synthesis mixture composition (table 1)

TABLE 1

Final modified synthesis mixture

|  | weight [g] | Mw [g · mol$^{-1}$] | Mol | molar ratio |
|---|---|---|---|---|
| Sodium hydroxide | 9.17 | 40 | 0.2292 | 17 |
| Sodium aluminate | 0.22 | 82 | 0.00265 | 0.2 |
| Sodium metasilicate | 1.66 | 122.06 | 0.01359 | 1 |
| Water | 47.06 | 18 | 2.615 | 192 |

Prior to the syntheses two mixtures were made in two separate polyethylene flasks. One (mixture A, table 2) contained the silica source, in this case sodium metasilicate dissolved in water with a high pH (so with a part of the sodium hydroxide). The other mixture (mixture B, table 3) also contained NaOH in water, and with the aluminium source, sodium aluminate. Both mixtures were well stirred for half an hour (in order to dissolve and hydrolyse the oxides) at ambient temperature.

TABLE 2

Composition mixture A

| Components mixture A | weight [g] |
|---|---|
| Sodium metasilicate | 1.66 |
| Sodium hydroxide | 5.59 |
| Water | 23.53 |

TABLE 3

Composition mixture B

| Components mixture B | weight [g] |
|---|---|
| Sodium aluminate | 0.22 |
| Sodium hydroxide | 4.12 |
| Water | 23.53 |

Subsequently the two mixtures were poured together and stirred well for another half hour (in order to obtain complete mixing of the components). In order to prevent pre-crystallisation half an hour aging was applied when preparing synthesis mixtures for zeolite growth on supports.

After this the mixture was put in a stainless steel autoclave with a teflon inner liner and the support (whether stainless steel with an TiO$_2$ layer or α-alumina). The autoclave was put in an oven (on a rotating axis in case of the rotating synthesis) for 3.5 hours at 140° C. Afterwards the autoclave was well cooled with tap water. Not only to stop the crystallisation (if the reaction continues zeolite A will be formed), but also for safety reasons: the caustic solution inside the autoclave is at its autogenic pressure. Subsequently the zeolites were filtered from the mixture and washed with water. In case of on-support growth, the 'coated' support is cleaned thoroughly with water.

XRD provided clarification that sodalite was made and whether other crystalline phases were present (zeolite A, cancrinite). For powders a Philips PW 1840 was used. Supported zeolite layers were identified by the Philips XRD of the Department of Materials Science of DelftChemTech (DCT), where also some sodalite powders have been analysed.

SEM pictures were taken on a Philips XL20 SEM at the Polymers Department (PME) of Delft Technical University and at a Philips SEM with EDAX elemental analysis at the TNO Prins Maurits Laboratories (PML) in Rijswijk.

Purification of Water

The pervaporation measurements were performed in a laboratory scale set-up. The membrane was sealed in a stainless steel membrane module, with the membrane side facing the feed (A=1.77 cm$^2$ effective membrane surface area and 1 µm selective layer thickness); the module was placed vertically in the oven of the pervaporation set-up with the selective layer directed upwards facing the liquid feed. Using a HPLC pump, fresh sea water was transported to the membrane module from a continuously stirred external liquid reservoir (Volume=5L) at a constant flow rate of 10 ml/min and the retentate was recycled back to the feed vessel. The feed vessel was heated independently to minimize temperature gradients between the feed and the oven.

The feed pressure was regulated with $N_2$ gas using a back-pressure controller and kept at 2.2 MPa to ensure a liquid phase feed at higher temperatures. A two-stage vacuum pump was used to evacuate the permeate side. The pressure at the permeate side was kept at a constant value of 300 Pa and was monitored using a digital vacuum gauge installed between the vacuum pump and the cold traps. The temperature of the feed inside the membrane cell and the permeate temperature were measured using two thermocouples. The permeate was collected in liquid nitrogen cold traps and samples collected from the cold traps were analyzed for the salt fraction using Inductively Coupled Plasma (ICP-OES) measurements on a PerkinElmer Optima 5300 dv. The detection limit of the analysis was 0.01 mg/l. Water collected at the permeate side was analyzed for Na, Ca, K, Li, Cu, Mn, Pb, Co, Cd, Ni, and Zn. No traces were detected in the permeate, i.e., the membrane selectivity towards water only is greater than 100,000.

The invention claimed is:

1. Process for the production of ultra pure water, comprising feeding water containing ions and optionally other impurities to one side of a membrane based on hydroxy sodalite (H-SOD), and recovering ultra pure water from the other side of the membrane.

2. Process according to claim 1, wherein the said hydroxy sodalite membrane is supported on a porous support.

3. Process according to claim 2, wherein the support is an α-alumina support.

4. Process according to claim 3, wherein the ultra pure water produced contains less than 0.01 mg/l impurities.

5. Process according to claim 3, wherein between the hydroxy sodalite membrane and the α-alumina support, an intermediate layer of mesoporous material, selected from a silica or titania, is present.

6. Process according to claim 2, wherein between the hydroxy sodalite membrane and the support, an intermediate layer of mesoporous material, selected from a silica or titania, is present.

7. Process according to claim 2, wherein the support is a ceramic support.

8. Process according to claim 7, wherein between the hydroxy sodalite membrane and the ceramic support, an intermediate layer of mesoporous material, selected from a silica or titania, is present.

9. Process according to claim 2, wherein the impurities are fine particles, salts, organic materials and/or bacteria.

10. Process according to claim 2, wherein the ultra pure water produced contains less than 0.01 mg/l impurities.

11. Process according to claim 10, wherein the process is a one-step process.

12. Process according to claim 2, wherein the process is a one-step process.

13. Process according to claim 2, wherein the membrane is a disk membrane.

14. Process according to claim 2, wherein the process is carried out at a pressure above the vapour pressure of water at the temperature used.

15. Process according to claim 1, wherein the said impurities are fine particles, salts, organic materials and/or bacteria.

16. Process according to claim 1, wherein the ultra pure water produced contains less than 0.01 mg/l impurities.

17. Process according to claim 16, wherein the process is a one-step process.

18. Process according to claim 1, wherein the process is a one-step process.

19. Process according to claim 1, wherein the said membrane is a disk membrane.

20. Process according to claim 1, wherein the process is carried out at a pressure above the vapour pressure of water at the temperature used.

* * * * *

UNITED STATES PATENT AND TRADEMARK OFFICE
CERTIFICATE OF CORRECTION

PATENT NO.        : 8,382,988 B2
APPLICATION NO. : 13/131984
DATED             : February 26, 2013
INVENTOR(S)       : Khajavi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 82 days.

Signed and Sealed this
First Day of September, 2015

Michelle K. Lee
*Director of the United States Patent and Trademark Office*